United States Patent

Oberst et al.

[15] 3,640,833
[45] Feb. 8, 1972

[54] VIBRATION DAMPED SANDWICH SYSTEMS HAVING INTERLAYERS OF VINYL ACETATE-ETHYLENE-N-BUTYLACRYLATE COPOLYMERS

[72] Inventors: Hermann Oberst; Leonhard Reihs, both of Hofheim/Taunus; Joachim Ebigt, Mainz; Gunther Duve, Frankfurt/Main; Alfred Schommer, Bad Soden/Taunus, all of Germany

[73] Assignee: Farbwerke Hoechst Aktiengesellschaft vormals Meister Lucius & Bruning, Frankfurt/Main, Germany

[22] Filed: Oct. 19, 1970

[21] Appl. No.: 82,112

Related U.S. Application Data

[63] Continuation-in-part of Ser. No. 631,080, Apr. 14, 1967, abandoned.

[30] Foreign Application Priority Data

Apr. 23, 1966 Germany ............................ F 49 031

[52] U.S. Cl. ............................ 161/165, 161/218, 181/33 G, 181/33 GA, 248/21, 260/80.81, 260/41 A, 260/80.8
[51] Int. Cl. ............... B32b 15/08, C08f 15/20, E04b 1/86
[58] Field of Search ............................ 161/165, 218; 248/21; 181/33 G, 33 GA; 260/80.8, 80.81, 878, 885; 117/132 C

[56] References Cited

UNITED STATES PATENTS

| | | | |
|---|---|---|---|
| 2,548,186 | 4/1951 | Wolf et al. | 260/80.81 |
| 3,201,374 | 8/1965 | Simms | 260/80.8 |
| 3,232,895 | 2/1966 | Klein et al. | 260/80.8 |
| 3,256,228 | 6/1966 | Tyran | 117/132 |
| 3,271,188 | 9/1966 | Albert et al. | 161/218 |
| 3,386,978 | 6/1968 | Salyer | 260/80.81 |
| 3,399,103 | 8/1968 | Salyer et al. | 161/218 |

OTHER PUBLICATIONS

"Vibration-Damping Plastics and Noise Suppression"; Oberst et al; Kunststoffe, Vol. 51; 9/1961; pp 495–502
Sandwich Systems with Optionally Designed Vibration-Damping Plastic Cores"; Oberst et al; Kunststoffe; Vol. 55; 8/1965; pp 634–640

*Primary Examiner*—John T. Goolkasian
*Assistant Examiner*—George W. Moxon, II
*Attorney*—Curtis, Morris & Safford

[57] ABSTRACT

Vibration damped sandwich systems having an improved damping effect within a broad range of temperature and consisting of hard plates and a vibration damping interlayer, said interlayer comprising a copolymer of ethylene, vinyl acetate, n-butyl-acrylate and acrylic and/or methacrylic acid.

3 Claims, 4 Drawing Figures

VIBRATION DAMPED SANDWICH SYSTEMS HAVING INTERLAYERS OF VINYL ACETATE-ETHYLENE-N-BUTYLACRYLATE COPOLYMERS

This application is a continuation-in-part of copending application Ser. No. 631,080, filed Apr. 14, 1967 and now abandoned.

The present invention provides vibration damped sandwich systems having interlayers made of vinyl acetate-ethylene-n-butylacrylate vibration damping differ acetate-ethylene copolymers.

It is known from South African Pat. No. 5,269 that highly valuable vibration-damping materials of a broad temperature band suitable for damping bending vibrations of metal sheet constructions can be prepared by copolymerization of monomers whose homopolymers differ in their second order transition temperature by at least 20° C. This patent also indicates that as vibration damping materials having a broad temperature band there are used, among others, predominantly amorphous copolymers of ethylene and vinyl esters of fatty acids containing two or three carbon atoms, for example vinyl acetate-ethylene copolymers. The vinyl acetate-ethylene copolymers hitherto used, however, have not been able to meet all technical requirements.

It has now been found that sandwich systems of hard plates, in particular metal sheets, having a considerably improved damping effect within a very large temperature range can be obtained by using as a vibration damping self-adhesive interlayer a copolymer of 70 to 50 percent by weight of vinyl acetate, 15 to 25 percent by weight of ethylene, 15 to 25 percent by weight of n-butylacrylate and 0 to 5 percent by weight of acrylic and/or methacrylic acid.

The incorporation of a third component still improves the damping properties of vinyl acetate-ethylene copolymers predominantly containing vinyl acetate, and these modified vinyl acetate-ethylene copolymers in which the damping effect depends critically on the weight proportion of the monomers, show straight and extremely broad damping curves having very high maximum values of damping within determined temperature ranges. Moreover, these copolymers may offer the advantage of reducing the costs of a vibration damping material.

Thus it has, for example, been found that vinyl acetate-ethylene copolymers modified with 15 to 25 percent by weight of n-butyl-acrylate exhibit a very high damping efficiency within the range of low temperatures. The additional incorporation of up to 5 percent by weight of acrylic and/or methacrylic acid still improves the adhesion of the terpolymers to be used according to the invention.

The following example sets forth a satisfactory procedure for preparing copolymers of vinyl acetate n-butylacrylate and ethylene. Other known polymerization techniques can also be used to prepare the polymers.

EXAMPLE I

A mixture of 1,200 g. of tert. butanol and 50 g. of water was placed into a heatable, 5 liter, refined-steel, high-pressure autoclave, the pH value of the mixture being adjusted to 4.0. The mixture was then heated to 65° C. and the ethylene pressure was adjusted to 40 atm. A solution of 6.0 g. of azodiisobutyronitrile in a mixture of 200 g. of butylacrylate and 800 g. of vinyl acetate was added over a period of 3 hours. The reaction temperature and the ethylene pressure were kept constant. Subsequently, the mixture was allowed to complete the reaction under the same conditions for 3 hours. The mixture was then cooled, relieved from pressure, and the copolymer was isolated from the reaction mixture by removing the solvent and residual monomers under reduced pressure. The resulting copolymer contained about 17 percent of ethylene, 17 percent of butylacrylate and 66 percent of vinyl acetate and had a molecular weight of about 800,000.

In the accompanying drawing, FIGS. 1a and 1b are plots showing the loss modulus $d_{comb}$ as a function of temperature.

A comparison of FIGS. 1a and 1b illustrates the superior efficiency of the novel systems. The curve in FIG. 1a shows the loss factor $d_{comb}$ of a metal sheet arrangement of the invention as a function of temperature. It is, for example compared with one of the most effective vibration damping materials known for metal sheet arrangements, namely a modified vinyl acetate copolymer containing plasticizers (curve in FIG. 1b). The copolymer shown in the curve of FIG. 1b is a thermoplastic adhesive especially suitable for preparing vibration damped metal sheet arrangements comprising two outer metal sheets and a self-adhesive thermoplastic as the vibration damping interlayer. Systems of this type provide a damping effect which is extremely high in its maximum and cannot be exceeded for physical reasons (cf. H. Oberst and A. Schommer, Kunststoffe 55, 634 (1965), especially FIG. 9). In a symmetrical arrangement comprising two metal sheets, each of a thickness of 0.5 millimeter, and an interlayer of a thickness of 0.3 millimeter, the loss factor $d_{comb}$ of the combined system, measured in the bending resonance method (cf. for example H. Oberst, L. Bohn and F. Linhardt, Kunststoffe 51, 495 (1961)), almost reaches the value $d_{comb}$ of 1. The known metal sheet constructions damped by one-sided damping coatings which are applied as layers of so-called vibration damping materials capable of being sprayed, trowelled or bonded, show loss factors generally less than $d_{comb}$=0.2, the combined system having a technically reasonable thickness of the coating or ratio of coating mass to plate mass. By means of the metal sheet sandwich systems which gain a growing importance in recent times, it is possible to obtain damping values increased by a multiple, when the interlayer material is chosen in the most appropriate composition and thickness, as is shown in the example cited herein.

The temperature band width of the damping in the metal sheet sandwich system does not only depend on the viscoelastic values of the interlayer and of the steel sheets, but, to a considerable extent, also on the "geometry" of the arrangement, i.e., on the ratio of the layer thicknesses (see cited literature (1965) FIGS. 8 and 10). In the case of metal sheet sandwich systems, it is advantageous to define the band width to be the range of the temperature interval within which the value $d_{comb}$=0.05 is exceeded. The damping effect of metal sheets which are not damped by additional vibration damping means in metal sheet constructions of a different kind, corresponds to values $d_{comb}$=0.01 and less. The reference value $d_{comb}$=0.05 thus means a considerable increase in the damping effect (by about 15 db. (decibel)) as compared to the "nil damping" $d_{comb}$=0.01.

In the curve shown in FIG. 1b, the reference value $d_{comb}$=0.05 is exceeded in the mainly interesting frequency range of from 100 to 1,000 c.p.s. (Hz.) at temperatures ranging from about 0° to 50° C., the temperature band width therefore amounts to about 50° C. It is for this reason that sandwich systems of this type are suitable for many technical fields of application. By modifying the content of plasticizers, it is possible to shift the temperature band of a high damping effect to higher temperatures and thus to adapt it to special technical uses, for example in machine units operating at elevated temperatures. This construction mode of metal sheet sandwich systems comprising a self-adhesive interlayer of the most appropriate composition and thickness, of a vibration damping material having a broad temperature band and being prepared by copolymerization of appropriate monomeric components, has hitherto not been excelled by other arrangements of a similar kind and can therefore be regarded as a standard system which can serve for judging the acoustic efficiency of the system of the invention by comparison.

FIGS. 1a and 1b show the temperature curves of the loss factor $d_{comb}$ of metal sheet sandwich systems comprising steel sheets of a thickness of 0.5 millimeter each and damping interlayers of a thickness of 0.3 millimeter within a frequency range of from 100 to 1,000 c.p.s.

The curves have been measured in sandwich systems comprising a. A copolymer of 64 percent by weight of vinyl acetate, 20 percent by weight of ethylene and 16 percent by weight of n-butylacrylate as an interlayer (according to the present invention) and b. a modified vinyl acetate copolymer containing plasticizers, as an interlayer.

The arrangement 1a of the invention, whose monomer proportion lies in the optimal range, shows straight curves of the loss factor $d_{comb}$ in function of temperature, and a surprisingly broad temperature band with very high maximum values of damping which corresponds, to a certain extent, to those of arrangement 1b. The damping center lies at −10° C. with maximum values in the range of from 0.4 to about 0.7. The temperature band width is 100° C. (for 100 c.p.s. (Hz.)) and 50° C. (for 1,000 c.p.s.). The arrangement exhibits good vibration damping properties down to a temperature of −30° C. so that the interlayer material can be used as a vibration damping material having a broad low-temperature band for the production of sandwich systems and for the vehicle construction as a whole, but also for special purposes, for example in the aircraft construction. Especially at 100 c.p.s., this system has a considerably broader temperature range of effective damping than the standard system (FIG. 1b).

A particular advantage of this vibration damping material resides in the fact that it is perfectly suitable for being applied continuously in the mass production of sandwich metal sheets. It also is a thermoplastic adhesive which can be applied to the metal sheets by trowelling, brushing or pouring at elevated temperatures. The sandwich system is then advantageously cooled under pressure between rolls. Except a degreasing the metal sheets do neither require a preliminary treatment nor another bond. Copolymers containing acrylic or methacrylic acid groups may even do without degreasing. An excellent adhesion is achieved.

The vibration damping material has a good resistance to flow within the range of the application temperatures, a resistance which may still be improved in the copolymers containing carboxyl groups, by a slight cross-linking, for example with epoxides or isocyanates. The sandwich metal sheets can be processed in a manner corresponding, within wide limits, to that of usual metal sheets, i.e., they may be creased, bent, shaped, welded and riveted. Unless their curvature radii are too narrow, they may even be formed with plug and ring.

There are obtained sandwich metal sheets having such a high damping effect and such a broad temperature range of damping as are well sufficient for most fields of application at low temperatures.

Small amounts of fillers, for example for improving the electric conductivity (improvement of the resistance welding) may be added to the vibration damping material. For not adversely affecting the damping effect, it is advantageous to add less than 1 percent by weight, preferably less than 0.5 percent by weight calculated on the polymer, of the filler amount. Appropriate fillers are, for example, heavy spar, silicic acid, graphite and soot.

The total thickness of the sandwich system of the invention preferably ranges between 1 and 6 millimeters. The interlayers may be in the range of from 0.1 to 1 millimeter, preferably from 0.2 to 0.5 millimeter. The maximum damping effect is obtained in symmetrical sandwich systems. The stiffness in flexure and the stability, however, are higher in asymetric sandwich arrangements having the same weight. These asymmetric sandwich systems are therefore preferred for uses which require the highest possible stability, calculated on the weight. The ratio between the thicknesses of, for example metal sheets, preferably ranges between 1.1 and 1.4.

Figure 1A:
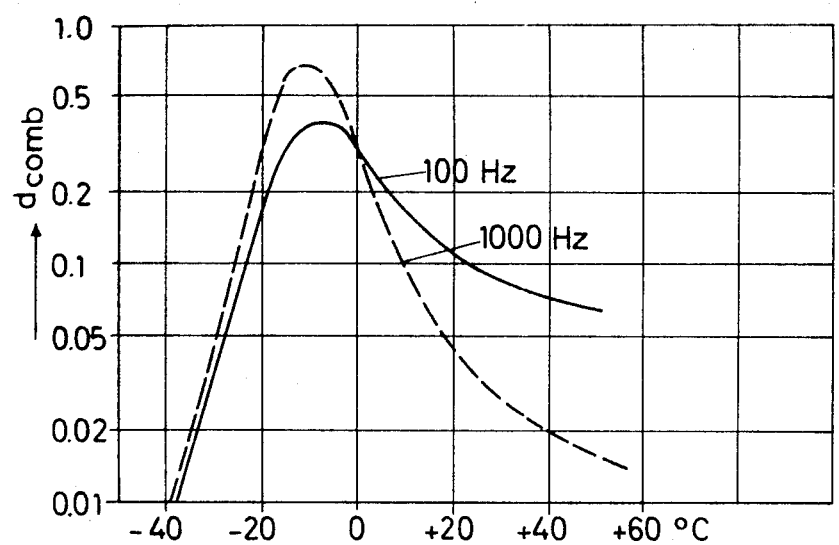
Figure 1B:
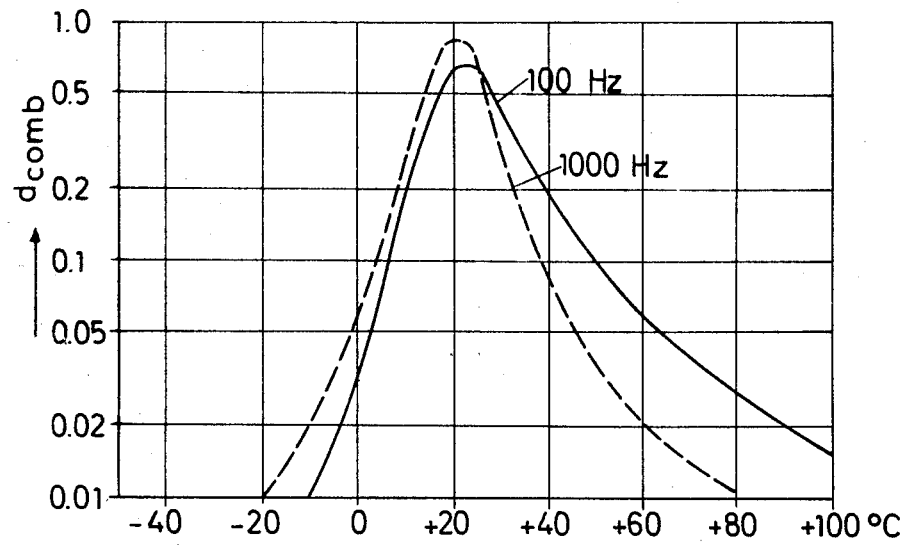
Figure 2A:
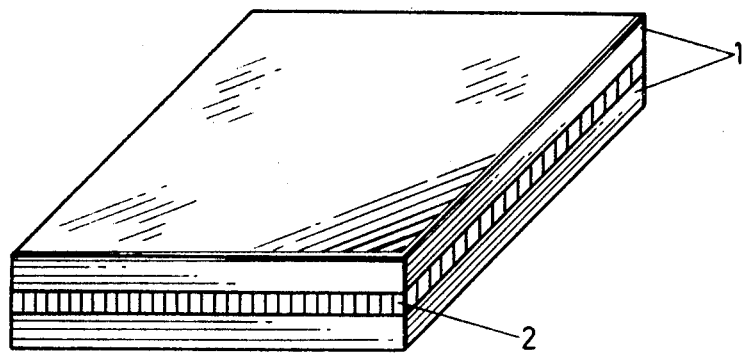
FIG. 2a shows a sandwich system of the invention in a symmetrical arrangement.
Figure 2B:
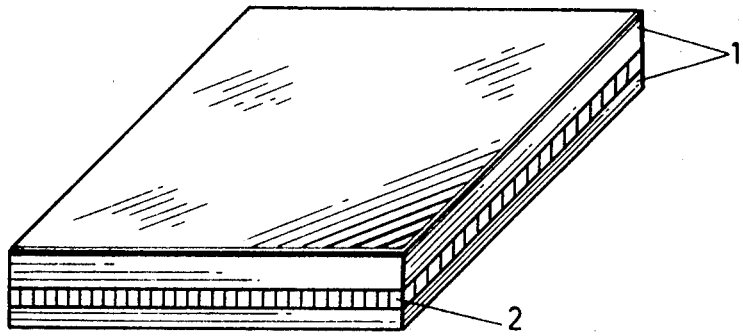
FIG. 2b shows a sandwich system in an asymmetric arrangement. The two outer plates or sheets (1) have the vibration damping layer (2) therebetween.

What is claimed is:

1. In a vibration damped sandwich system including hard plates and a vibration damping interlayer, and interlayer having improved damping effect within a broad temperature range, comprising: a copolymer of 70–50 percent by weight vinyl acetate, 15 to 25 percent by weight ethylene, and 15 to 25 percent by weight n-butylacrylate.

2. An improved vibration damping interlayer as recited in claim 1, wherein the copolymer contains up to 1 percent weight, calculated on the copolymer, of a filler selected from the group consisting of heavy spar, silicic acid, graphite and soot.

3. A vibration damped sandwich system as recited in claim 1 comprising outer plates having a thickness ratio to one another from 1:1 to 1:4.

* * * * *